United States Patent [19]

Stockford et al.

[11] 4,229,187

[45] Oct. 21, 1980

[54] MOVABLE, CONTINUOUSLY CHANGING, SELF-CHARGING ELECTROSTATIC FILTER

[75] Inventors: William F. Stockford; Joseph M. Gamewell, both of Salisbury, N.C.

[73] Assignee: Gamewell Manufacturing, Inc., Salisbury, N.C.

[21] Appl. No.: 28,524

[22] Filed: Apr. 9, 1979

[51] Int. Cl.³ .......................... B03C 3/10; B01D 46/22

[52] U.S. Cl. .......................................... 55/14; 55/103; 55/131; 55/149; 55/155; 55/354; 55/524; 55/528

[58] Field of Search .................... 55/14, 103, 113–116, 55/131, 149, 155, 354, 528, 524

[56] References Cited

U.S. PATENT DOCUMENTS

| | | | |
|---|---|---|---|
| 2,579,440 | 12/1951 | Palmer | 55/114 |
| 2,612,966 | 10/1952 | Nicol | 55/103 |
| 2,812,038 | 11/1957 | Krueger | 55/103 X |
| 3,375,638 | 4/1968 | Dungler | 55/116 |
| 3,417,552 | 12/1968 | Dyer et al. | 55/528 |
| 3,537,238 | 11/1970 | Dungler | 55/131 |
| 3,783,588 | 1/1974 | Hudis | 55/131 X |
| 4,011,067 | 3/1977 | Carey, Jr. | 55/354 |
| 4,153,433 | 5/1979 | Kihlstrom | 55/528 X |

FOREIGN PATENT DOCUMENTS

| | | | |
|---|---|---|---|
| 2002871 | 2/1979 | United Kingdom | 55/385 R |

OTHER PUBLICATIONS

Van Orman, W. T. et al., *Self-Charging Electrostatic Air Filters,* in Heating, Piping & Air Conditioning, p. 157–163, Jan. 1952.

*Primary Examiner*—Kathleen J. Prunner

[57] ABSTRACT

A non-woven, relatively thin filter media is formed of fine denier fibers wherein the media exhibits the characteristics of developing an electrostatic charge in the presence of a substantially dry air stream moving at a speed of at least 200 feet per minute. The fibers are selected from the group containing polyester, nylon, and polypropylene. A length of filter material so formed is moved or passed through an air stream or path containing weld smoke. The moving air causes the unique filter media to become electrostatically charged so that the fine particulate matter from the gaseous stream are removed more effectively than before.

2 Claims, 1 Drawing Figure

MOVABLE, CONTINUOUSLY CHANGING, SELF-CHARGING ELECTROSTATIC FILTER

BACKGROUND OF THE INVENTION

In industrial environments such as those containing weld smoke produced from the welding of aluminum, magnesium, steel, and similar metals, the clean up of such contaminated air prior to either reuse or discharge is a serious problem. Generally, prior to the enactment of more stringent environmental laws concerning clean up of air before discharge to the atmosphere, the problem was so great that such contaminants were usually merely discharged to the atmosphere. Now the problem has to be met, since the discharge of such contaminating exhausts is being more strictly controlled.

The two most conventional systems for separating contaminants from a gas stream include the use of either a stationary or movable filter media in the path of the gas stream (mechanical separation) or the use of an electrostatic filter. In the first system, a filter media material is utilized in either a fixed or movable system and as the air passes through the media, the pores or openings in the media allow the air to pass through while most of the contaminants are mechanically caught or trapped by the fibers or mesh of the filter material. In the case of weld smoke, however, the contaminants are so finely dispersed in the air stream that they pass right through the pores or openings in conventional media with the result that the percentage of contaminants removed is too low. Fiberglass is the most usual material for such media and if it is attempted to manufacture the fiberglass media with a tighter construcion, the pressure drop across the media becomes so great that the system is not efficient. In other words, the increased energy consumption of the system resulting from the larger size fan necessary to push the air through the tight fiberglass media is highly undesirable.

In the second method, while an electrostatic filter is initially very efficient and works well, the problem with utilizing it to separate contaminants from weld smoke is that a film of contaminants soon builds up on the plates of the electrostatic filter and provides an electrically insulating barrier. The electrostatic filter then becomes very inefficient. In an environment containing weld smoke such an insulating layer builds up after a couple of hours use. It is then necessary to wash the plates of the filter and allow them to dry before the electrostatic filter can again be used. Thus the electrostatic filter must be removed from service for a few minutes to an hour every two to three hours. As can easily be seen this is therefore completely unacceptable.

SUMMARY OF THE PRESENT INVENTION

The present invention, on the other hand, is directed to an approach in which the efficiency obtained by separating with an electrostatic filter is achieved, yet the filter is moved or changed, similar to a rotary drum filter type separating system. Further, there is no energy or voltage input to the system needed to provide the electrostatic charge.

Rather, the electrostatic charge is generated by the movement of relatively dry air past a particular type of material, which thus provides a naturally charged media, which media is caused to pass through the system from a supply roll to a take-up roll responsive to build up of contaminants on the media. Thus, as the media is moved into the air stream, the passage of air past the media generates the electrostatic charge therein which causes the media to attract the contaminants from the weld smoke which are apparently oppositely charged. By the time the electrostatically charged media has built up a coating of contaminants thereon which would make the media less efficient as far as collecting contaminants is concerned, the media is moved out of the air path and onto the take-up roll.

The filter media of the present invention is formed of a non-woven, relatively thin material composed of relatively fine denier fibers of either polyester, nylon, or polypropylene. Preferably, it has been found that polyester fibers which are formed into a non-woven fabric and normally used for furniture pads or backings is ideal for this system. Such a non-woven polyester fabric is available from Cardel Fabrics of Salisbury, North Carolina, and sold under part number 481-5oz. This fabric is relatively thin and composed of very fine denier polyester fibers. While the air speed passing the media is not critical it is considered that the air speed should be maintained at least in the range of 200 feet per minute or more to ensure that a good electrostatic charge is built up on the fabric.

It is therefore an object of the present invention to provide a filter device which effectively removes contaminants from weld smoke.

It is another object of the present invention to provide an effective filter device of the type described which includes the use of a non-woven, relatively thin material formed from synthetic fibers of the type which generate an electrostatic charge in the presence of moving air.

It is yet another object of the present invention to provide an improved self-charging, movable, electro static filter.

Other objects and a fuller understanding of the invention will become apparent after reading the following detailed description of a preferred embodiment along with the drawing in which:

The sole FIGURE is a schematic plan view of a portion of an air treatment system in which the present invention is installed.

DETAILED DESCRIPTION OF PREFERRED EMBODIMENT

Figure 1:
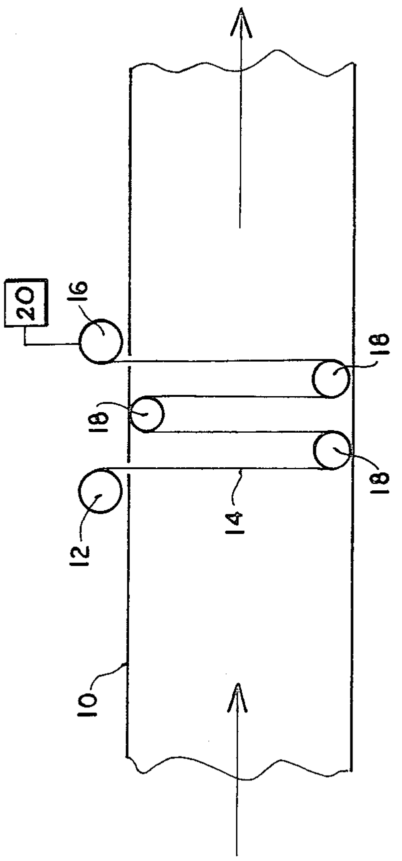

Turning now to a discussion of the drawing and the invention in more detail, in a conventional air treating system, contaminated air is passed through a conduit 10 through some type of separating equipment. There may be in addition air washers, coolers or heaters, humidifiers, or other air treatment equipment; however, in the present invention the only interest is in the filtering apparatus or air separating equipment.

In this regard, there is provided a supply roll 12 and a take-up roll 16 and a length of filter media 14 which extends therebetween in the path of the contaminants within the conduit 10 of the air treating system. The filter media 14 may pass around one or more return rolls 18 as illustrated in the drawing, or may pass around a drum (not shown), or may be passed through the air stream in any other conventional and well known manner, which means (indicated at 20 in the illustration) is not important or critical to the invention.

Turning now to a discussion of the filter media 14 itself, it is preferably a non-woven fabric formed in relatively thin sheets or lengths from relatively fine denier fibers of any polymeric material that exhibits the characteristics of generating an electrostatic charge in the presence of moving air. Such materials which are known to exhibit such a characteristic are polyester, nylon, and polypropylene, however, there may be others. One specific fabric which is known to operate satisfactorily is manufactured by Cardel Fabrics of Salisbury, North Carolina, and sold as a non-woven polyester number 481-5oz. The 5oz. represents 5 ounces per square yard weight, and the fibers are 1.5 to 6 denier. This type of fabric is constructed of polymeric fibers in a ratio of approximately 50% large fibers to 50% small fibers within the range of 1.5–6 denier which are mixed so that the large and small fibers are evenly distributed among each other. A resin bonding agent is then added under such conditions and in quantities sufficient to permeate the thickness of the fabric and coat all of the fibers throughout the mix, and the mixture of fibers and resin agent is then heat cured. The polyester non-woven fabric manufactured by Cardel Fabrics is conventionally made as a furniture pad or backing to be placed between the springs and the cushions, however, has been found to provide exceptional results when utilized as the filter media for weld smoke in that the electrostatic charge which is built is opposite to that of the particulate matter in the weld smoke.

While the air speed is not critical the system is normally operated with an air speed of from 350 to 400 feet per minute and it is believed that speeds of at least 200 feet per minute will be sufficient to generate the electrostatic charge in the fabric necessary to effectively operate as a filter. There is thus provided the only movable, self-charging, electrostatic filter known to the applicant. Such apparatus has provided the only acceptable filter system which will effectively and practically remove weld smoke in situations where such weld smoke was previously merely exhausted to the atmosphere. The air containing the weld smoke is now moved through the filter media according to the present invention and cleaned to such an extent that it may be returned into the work room as make-up air, a situation which was unheard of prior to the present invention.

While a specific embodiment has been shown in detail and described hereinabove it is apparent that various changes and modifications might be made without departing from the scope of the invention which is set forth in the claims below.

What is claimed is:

1. A movable electrostatic filter device particularly effective for separating contaminants from an air path containing weld smoke and the like comprising:
(a) means for confining said air path;
(b) a length of relatively thin, non-woven filter media formed of a synthetic material constructed of fibers from the polymeric group including polyester, nylon, and polypropylene, said non-woven material having the characteristics of:
(i) generating an electrostatic charge in the presence of air moving at a velocity of at least 200 feet per minute; and
(ii) including fibers in the range of 1.5 to 6 denier in a homogenous mix of substantially 50% larger fibers and 50% smaller fibers with a resin agent distributed evenly throughout the mixture and completely throughout the thickness of the media prior to heat curing;
(c) a supply roll and a take-up roll;
(d) means for moving said filter media across said air path between said supply roll and said take-up roll;
whereby said filter media becomes electrostatically charged solely by the movement of air thereby without any voltage or any energy input to the filter media.

2. A method for separating contaminants from an environment containing weld smoke or the like comprising the steps of:
(a) moving contaminated air from the environment through an air separating device;
(b) at the air separating device passing a movable, self-charing electrostatic filter through the contaminated air, said filter being formed of a length of relatively thin non-woven filter media formed of a synthetic material constructed of fibers from the polymeric group including polyester, nylon, and polypropylene, said material having the characteristics of:
(i) generating an electrostatic charge in the presence of air moving at a velocity of at least 200 feet per minute, and;
(ii) including fibers in the range of 1.5 to 6 denier in a homogenous mix of substantially 50% large fibers and 50% small fibers with a resin bonding agent distributed evenly throughout the mixture and completely throughout the thickness of the media prior to heat curing.

* * * * *